(12) United States Patent
Perlman et al.

(10) Patent No.: US 8,085,804 B2
(45) Date of Patent: Dec. 27, 2011

(54) SYSTEM AND METHOD FOR PROCESSING MULTIPLE BROADCAST MULTIMEDIA STREAMS

(75) Inventors: Stephen G. Perlman, Palo Alto, CA (US); Michael Sleator, Woodside, CA (US)

(73) Assignee: ARRIS Group, Inc., Suwanee, GA (US)

( * ) Notice: Subject to any disclaimer, the term of this patent is extended or adjusted under 35 U.S.C. 154(b) by 568 days.

(21) Appl. No.: 11/683,295

(22) Filed: Mar. 7, 2007

(65) Prior Publication Data

US 2007/0147406 A1 Jun. 28, 2007

Related U.S. Application Data

(63) Continuation of application No. 09/790,076, filed on Feb. 20, 2001, now abandoned.

(51) Int. Cl.
 *H04L 12/54* (2006.01)
(52) U.S. Cl. ..................................................... 370/429
(58) Field of Classification Search .......... 370/412–429, 370/385.1, 388.2, 397.1, 398.1, 402.1, 536, 370/203, 229–240, 241–253, 254–258, 298–306, 370/351–356, 357–395, 395.1, 395.2, 395.21, 370/395.3, 395.31, 395.32, 395.4, 395.41, 370/395.42, 395.43, 395.5, 395.52, 395.53, 370/395.54, 395.6, 395.61, 396–411, 503–520
 See application file for complete search history.

(56) References Cited

U.S. PATENT DOCUMENTS

| 4,944,008 A | 7/1990 | Piosenka et al. |
| 5,146,325 A | 9/1992 | Ng |
| 5,230,019 A | 7/1993 | Yanagimichi et al. |
| 5,371,551 A | 12/1994 | Logan et al. |
| 5,414,455 A * | 5/1995 | Hooper et al. .................. 725/88 |
| 5,444,491 A | 8/1995 | Lim |
| 5,477,263 A | 12/1995 | O'Callaghan et al. |
| 5,481,296 A * | 1/1996 | Cragun et al. ................. 725/136 |
| 5,493,581 A * | 2/1996 | Young et al. .................. 375/350 |
| 5,495,246 A | 2/1996 | Nichols et al. |
| 5,515,373 A | 5/1996 | Lynch et al. |

(Continued)

FOREIGN PATENT DOCUMENTS

EP 0 346 700 12/1989

(Continued)

OTHER PUBLICATIONS

PCT International Search Report in PCT/US02/05206 filed Feb. 13, 2002.

(Continued)

*Primary Examiner* — Kwang B Yao
*Assistant Examiner* — Jung-Jen Liu
(74) *Attorney, Agent, or Firm* — Troy A. Van Aacken; Robert J. Starr

(57) ABSTRACT

A computer-implemented method is disclosed including: receiving a broadcast signal containing a set of multiplexed multimedia channels; storing said multiplexed multimedia channels in a temporary storage buffer on a mass storage device; determining a point in said temporary storage buffer to begin demultiplexing and decoding a first channel responsive to a user request to view a particular program on said first channel in its entirety, said point indicating the start of said program on said first channel; and demultiplexing and decoding said first channel of said set of multiplexed multimedia channels from said point within said temporary storage buffer.

34 Claims, 15 Drawing Sheets

U.S. PATENT DOCUMENTS

| | | | |
|---|---|---|---|
| 5,544,327 A * | 8/1996 | Dan et al. | 709/234 |
| 5,574,964 A | 11/1996 | Hamlin | |
| 5,584,023 A | 12/1996 | Hsu | |
| 5,594,509 A * | 1/1997 | Florin et al. | 725/43 |
| 5,627,539 A | 5/1997 | Lynch et al. | |
| 5,631,651 A | 5/1997 | Nichols et al. | |
| 5,634,074 A | 5/1997 | Devon et al. | |
| 5,650,831 A | 7/1997 | Farwell | |
| 5,721,727 A | 2/1998 | Ashi | |
| 5,727,233 A | 3/1998 | Lynch et al. | |
| 5,732,216 A | 3/1998 | Logan et al. | |
| 5,734,589 A | 3/1998 | Kostreski et al. | |
| 5,734,862 A | 3/1998 | Kulas | |
| 5,761,180 A | 6/1998 | Murabayashi et al. | |
| 5,799,190 A | 8/1998 | Lynch et al. | |
| 5,819,298 A | 10/1998 | Wong et al. | |
| 5,838,873 A | 11/1998 | Blatter et al. | |
| 5,862,220 A | 1/1999 | Perlman | |
| 5,870,477 A | 2/1999 | Sasaki et al. | |
| 5,883,869 A | 3/1999 | Tamai et al. | |
| 5,892,536 A | 4/1999 | Logan et al. | |
| 5,896,444 A | 4/1999 | Perlman et al. | |
| 5,918,013 A | 6/1999 | Mighdoll et al. | |
| 5,931,949 A | 8/1999 | Perlman et al. | |
| 5,938,748 A | 8/1999 | Lynch et al. | |
| 5,940,073 A | 8/1999 | Klosterman et al. | |
| 5,963,909 A | 10/1999 | Warren et al. | |
| 5,966,385 A * | 10/1999 | Fujii et al. | 370/465 |
| 5,978,381 A | 11/1999 | Perlman et al. | |
| 5,983,273 A | 11/1999 | White et al. | |
| 5,986,692 A | 11/1999 | Logan et al. | |
| 6,005,938 A | 12/1999 | Banker et al. | |
| 6,005,940 A | 12/1999 | Kulinets | |
| 6,014,693 A | 1/2000 | Ito et al. | |
| 6,014,694 A | 1/2000 | Aharoni et al. | |
| 6,023,585 A | 2/2000 | Perlman et al. | |
| 6,026,079 A | 2/2000 | Perlman | |
| 6,034,732 A * | 3/2000 | Hirota et al. | 348/441 |
| 6,044,396 A | 3/2000 | Adams | |
| 6,072,872 A | 6/2000 | Chang et al. | |
| 6,073,168 A | 6/2000 | Mighdoll et al. | |
| 6,084,583 A | 7/2000 | Gerszberg et al. | |
| 6,088,455 A | 7/2000 | Logan et al. | |
| RE36,801 E | 8/2000 | Logan et al. | |
| 6,111,612 A * | 8/2000 | Ozkan et al. | 348/465 |
| 6,118,498 A | 9/2000 | Reitmeier | |
| 6,134,590 A | 10/2000 | Perlman | |
| 6,138,147 A | 10/2000 | Weaver et al. | |
| 6,141,356 A | 10/2000 | Gorman | |
| 6,141,693 A | 10/2000 | Perlman et al. | |
| 6,148,082 A * | 11/2000 | Slattery et al. | 380/212 |
| 6,157,948 A * | 12/2000 | Inoue et al. | 709/219 |
| 6,160,545 A * | 12/2000 | Eyer et al. | 715/721 |
| 6,169,879 B1 | 1/2001 | Perlman | |
| 6,185,228 B1 * | 2/2001 | Takashimizu et al. | 370/535 |
| 6,188,397 B1 | 2/2001 | Humpleman | |
| 6,199,076 B1 | 3/2001 | Logan et al. | |
| 6,199,114 B1 | 3/2001 | White et al. | |
| 6,226,241 B1 | 5/2001 | D'Amato et al. | |
| 6,233,389 B1 | 5/2001 | Barton et al. | |
| 6,263,035 B1 * | 7/2001 | Maresca | 375/371 |
| 6,360,368 B1 | 3/2002 | Chawla | |
| 6,366,731 B1 | 4/2002 | Na et al. | |
| 6,453,116 B1 | 9/2002 | Ando et al. | |
| 6,505,299 B1 | 1/2003 | Zeng et al. | |
| 6,510,554 B1 | 1/2003 | Gordon et al. | |
| 6,526,580 B2 | 2/2003 | Shimomura et al. | |
| 6,538,999 B1 * | 3/2003 | Sato | 370/252 |
| 6,543,053 B1 * | 4/2003 | Li et al. | 725/88 |
| 6,578,070 B1 | 6/2003 | Weaver et al. | |
| 6,603,488 B2 | 8/2003 | Humpleman | |
| 6,611,503 B1 | 8/2003 | Fitzgerald et al. | |
| 6,853,728 B1 | 2/2005 | Kahn et al. | |
| 7,024,679 B1 * | 4/2006 | Sie et al. | 725/101 |
| 7,079,752 B1 | 7/2006 | Leyendecker | |
| 2002/0061183 A1 | 5/2002 | MacInnis | |
| 2003/0226150 A1 * | 12/2003 | Berberet et al. | 725/94 |

FOREIGN PATENT DOCUMENTS

| | | |
|---|---|---|
| EP | 0 364 229 | 4/1990 |
| EP | 0 512 398 | 11/1992 |
| EP | 0 666 694 | 8/1995 |
| EP | 0 676 761 | 10/1995 |
| EP | 0 693 727 | 1/1996 |
| EP | 0 714 204 | 5/1996 |
| EP | 0 749 244 | 12/1996 |
| EP | 0 756 393 | 1/1997 |
| EP | 0 753 964 | 5/1997 |
| EP | 0 773 681 | 5/1997 |
| EP | 0 903 738 | 9/1998 |
| EP | 0 911 962 | 4/1999 |
| EP | 0 971 358 | 1/2000 |
| EP | 1032195 A2 | 8/2000 |
| EP | 1056279 A1 | 11/2000 |
| EP | 1018835 A2 | 12/2000 |
| EP | 1 079 581 | 2/2001 |
| EP | 1 143 722 | 10/2001 |
| WO | WO 96/08912 | 3/1996 |
| WO | WO 99/22513 | 5/1999 |
| WO | WO 99/33265 | 7/1999 |
| WO | WO 00/01149 | 1/2000 |
| WO | WO 00/51129 | 8/2000 |
| WO | WO 01/04893 | 1/2001 |
| WO | WO 01/11865 | 2/2001 |
| WO | WO 01/37546 | 5/2001 |
| WO | WO 01/74079 | 10/2001 |

OTHER PUBLICATIONS

PCT International Search Report in PCT/US01/22002 filed Apr. 10, 2002.

PCT International Search Report in PCT/US01/22002 filed Feb. 14, 2002.

Notice of Panel Decision from Pre-Appeal Brief Review in U.S. Appl. No. 09/790,076, filed Feb. 20, 2001.

Office Action mailed Mar. 22, 2007 in U.S. Appl. No. 09/790,076, filed Feb. 20, 2001.

Office Action mailed Aug. 28, 2006 in U.S. Appl. No. 09/790,076, filed Feb. 20, 2001.

Office Action mailed Mar. 8, 2006 in U.S. Appl. No. 09/790,076, filed Feb. 20, 2001.

Office Action mailed Oct. 5, 2005 in U.S. Appl. No. 09/790,076, filed Feb. 20, 2001.

* cited by examiner

SYSTEM AND METHOD FOR PROCESSING MULTIPLE BROADCAST MULTIMEDIA STREAMS

CROSS-REFERENCE TO RELATED APPLICATIONS

This application is a continuation of U.S. patent application Ser. No. 09/790,076, filed Feb. 20, 2001, which is incorporated by reference herein in its entirety.

BACKGROUND

1. Field of the Invention

This disclosure relates generally to the field of multimedia systems. More particularly, this disclosure relates to a multimedia system capable of intelligently processing and storing several independent broadcast multimedia streams (e.g., broadcast cable or satellite streams).

2. Description of the Related Art

A prior art system for receiving broadcast multimedia signals is illustrated in FIG. 1. The system includes one or more tuners 120, 121 configured to lock on to multimedia signals 100, 101 transmitted at a carrier frequency and down-convert the signals to baseband signals. Quadrature Amplitude Modulation ("QAM") demodulators 130, 131 demodulate the baseband signals to extract the underlying digital content. As is known in the art, QAM is a modulation technique employed by cable and satellite providers that generates four bits out of one baud. For example, a 600 baud line (600 shifts in the signal per second) can effectively transmit 2,400 bps using this method. Both phase and amplitude are shaped with each baud, resulting in four possible patterns. As indicated in FIG. 1, certain multimedia systems (primarily satellite systems) use a different modulation technique known as Differential Phase Shift Keying ("DPSK") rather than QAM to demodulate the multimedia signals 100-101.

The video signal demodulated by the QAM/DPSK demodulators 130, 131 contains a plurality of statistically multiplexed multimedia streams, each containing content for a single cable or satellite "channel" (e.g., HBO). Satellite systems employ a series of transponders for receiving the multiplexed streams and cable systems typically receive the multiplexed streams over 6 Mhz channels. In either case, the multiplexed streams are transmitted at a combined data rate of approximately 40 Mbits/second, as indicated in FIG. 1.

Referring to FIG. 2, each stream/channel may be identified by a predetermined group of packet identification ("PID") codes. PID filter modules 140, 141 extract all packets from the set of multiplexed streams having PID codes associated with a specified stream (e.g., the stream which a user is currently watching). For example, in FIG. 2, PID 7 identifies the specified stream's video content and PIDs 5 and 6 identify the stream's audio left and audio right, respectively. Various additional PIDs may be associated with a stream and used to transmit channel-specific data/content (e.g., dolby digital content, . . . etc).

The multimedia content contained in the stream is then stored on a mass storage device 160, which may be used for temporary storage and/or long term storage of the content. Temporary storage features include pause and rewind functions for live television broadcasts and the ability to begin watching a program after the designated start time for the program. Long term storage functions include the ability to record entire programs for later viewing (similar to the functions provided by standard VCR). The multimedia content is then decompressed/decoded by one or more MPEG-2 decoder modules 170 before being rendered on a television display 135.

As illustrated in FIG. 1, prior art systems may also utilize a main memory 126 for storing instructions and data and a central processing unit ("CPU") 125 for executing the instructions and data. For example, the CPU may provide a graphical user interface displayed on the television, allowing the user to select certain television or audio programs for playback and/or storage on the mass storage device 120. In addition, prior art system also include one or more conditional access modules (not shown) for preventing users from viewing programs which they do not have the right to view (e.g., subscription-based channels such as HBO and pay-per-view events).

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Figure 1:
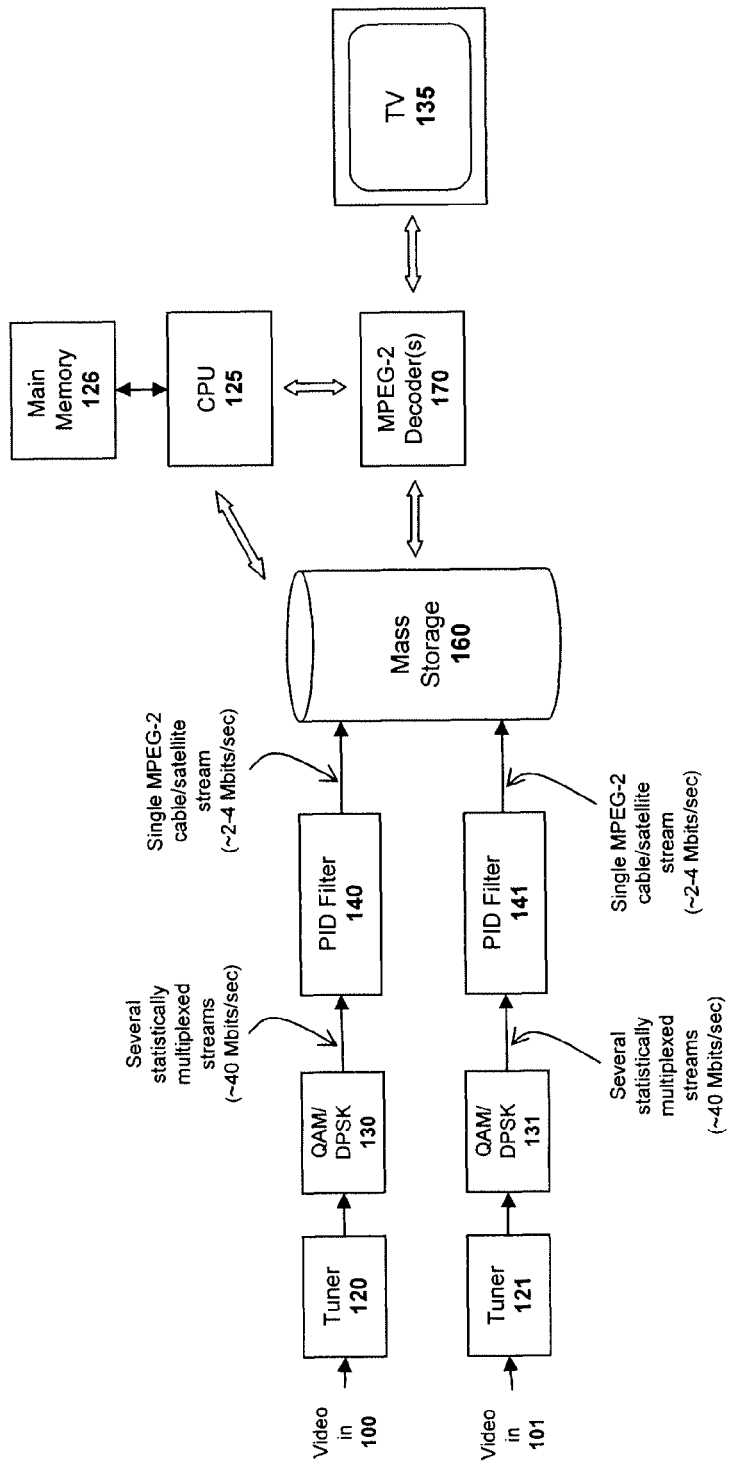
FIG. 1 illustrates a prior art multimedia receiver, storage and playback system.
Figure 2:
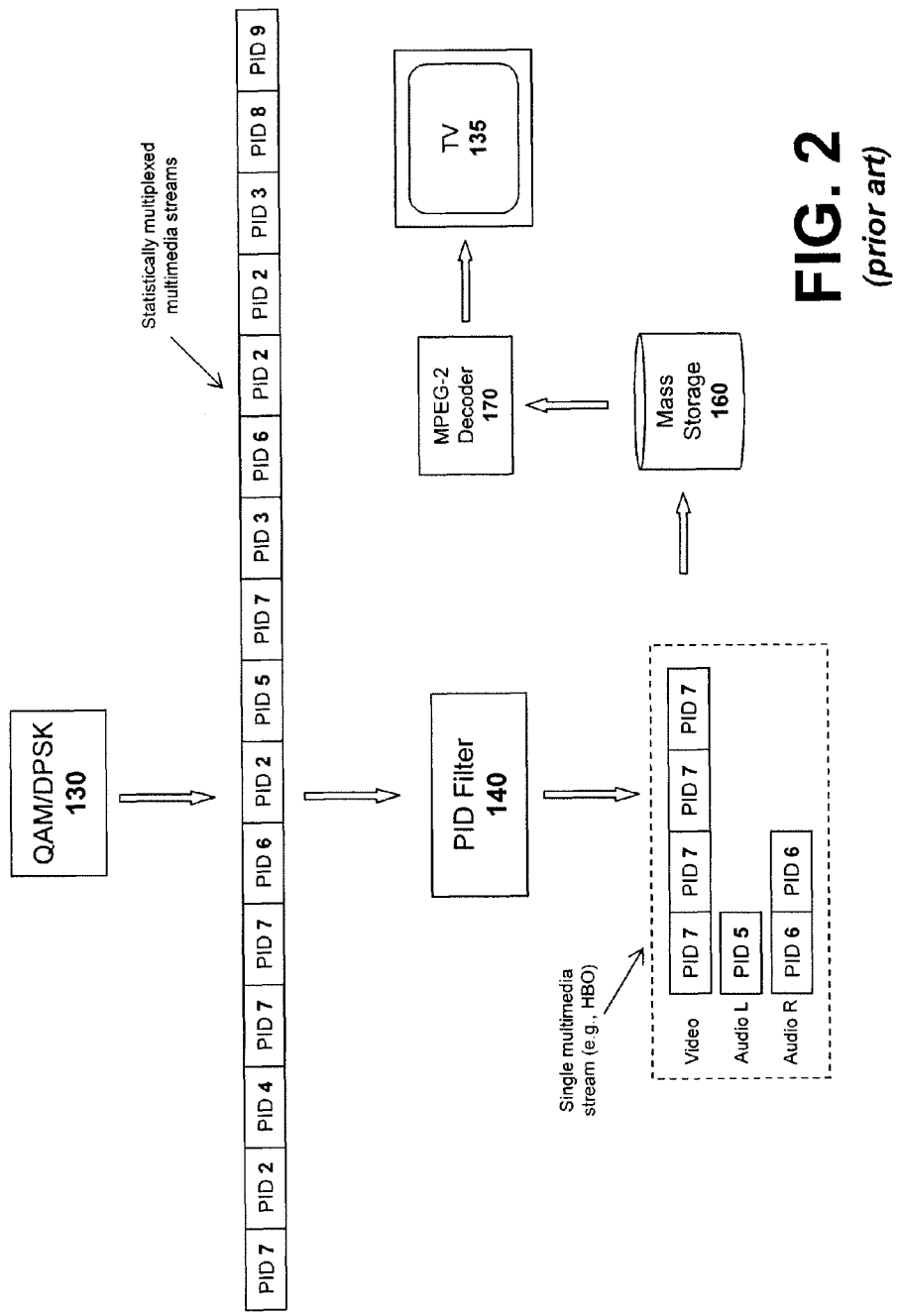
FIG. 2 illustrates packetized, statistically multiplexed multimedia content as processed by a prior art system.
Figure 3:
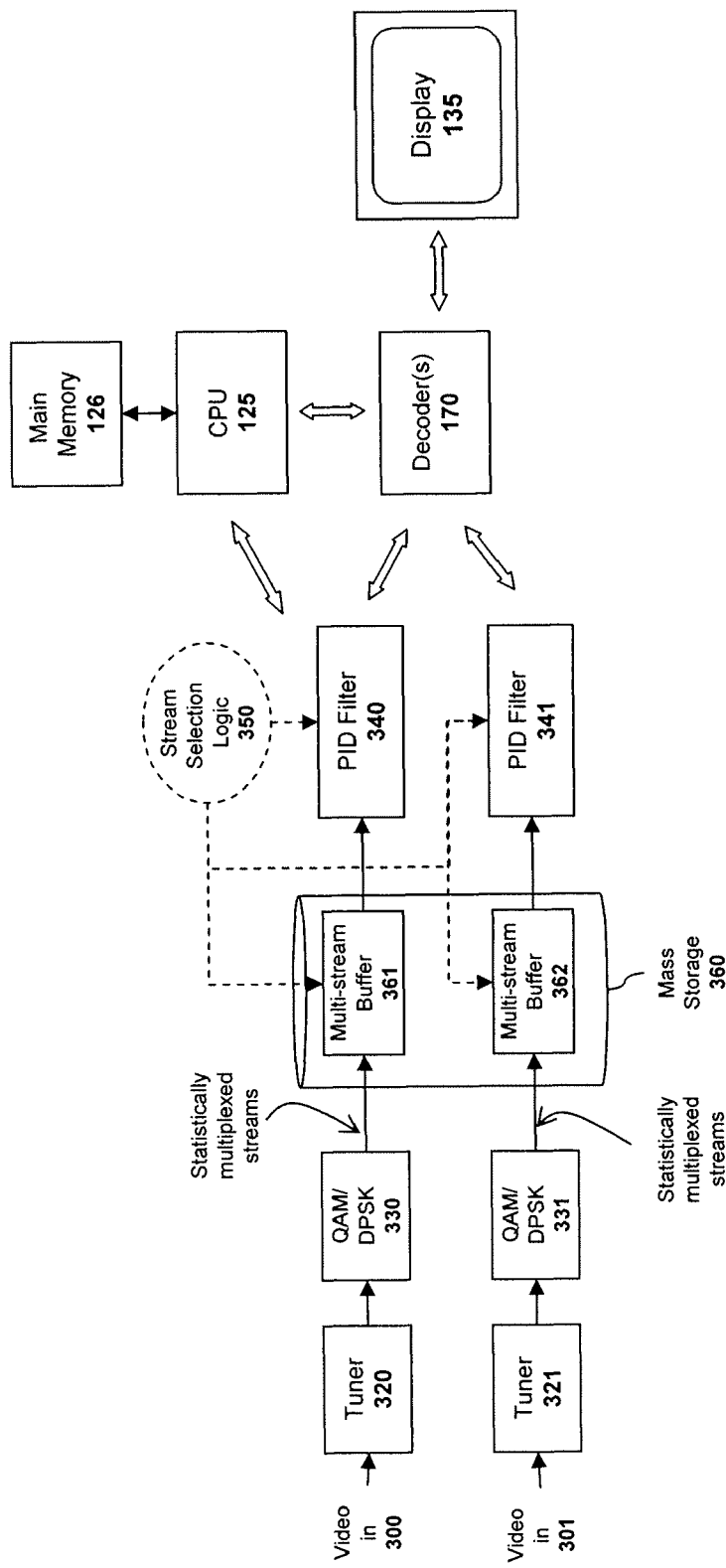
FIG. 3 illustrates one embodiment of a system for storing and processing multiple broadcast multimedia streams.

Embodiments of a System and Method for Processing Multiple Broadcast Multimedia Streams As illustrated in FIG. 3, one embodiment of the invention includes one or more tuners 320, 321 for receiving numerous statistically multiplexed streams within a specified frequency range and corresponding QAM and/or DPSK modules 330, 331 for demodulating the multiplexed streams. Unlike prior art systems, however, the system illustrated in FIG. 3 transfers all of the statistically multiplexed multimedia content (or a subset thereof) directly to multi-stream buffers 361, 362 on the mass storage device 360. The buffers may be configured to store a specified duration of content (e.g., two hours) and/or a specified amount of content (e.g., 80 Gbytes). When a user selects a particular cable or satellite channel, the PID filter modules 340 and 341 (also referred to herein as a "PID depacketizer") extract the multimedia packets for that channel (i.e., identified by the channel's PID codes) and reconstruct the underlying audio/video content by combining the packets in the proper order (i.e., the PID filter modules demultiplex and/or depacketize the content). One or more decoder modules 170 then decode the multimedia content using the appropriate decode/decompression algorithm (e.g., MPEG-2, MPEG-4, RealVideo® 8, Windows Media Technologies ("WMT"), . . . etc) and transmit the decoded multimedia content to a display 135 (e.g., a computer monitor or a television).

As mentioned above, if MPEG-2 is used as the compression algorithm, one set of multiplexed streams may have a combined bitrate approaching 40 Mbits/sec (or 16 Gbytes/hr); two sets, a combined bitrate of 80 Mbits/sec (or 32 Gbytes/hr) as indicated in FIG. 3. Accordingly, the mass storage device 360 of this embodiment is equipped with sufficient storage capacity and read-write bandwidth to store and process the multiplexed signal(s). More specifically, the mass storage device 360 in one embodiment is coupled to the system via an Ultra DMA-66/Ultra ATA-66 or faster interface (capable of supporting a throughput of at least 528 Mbits/sec), and has a storage capacity of 80 Mbytes or greater. It should be noted, however, that the particular interface type/speed and drive storage capacity is not pertinent to the underlying principles of the invention. For example, various different interfaces such as Small Computer System Interface ("SCSI") may be used instead of the Ultra-ATA/Ultra DMA interface mentioned above, and various different drive capacities may be employed for storing the incoming digital content.

Figure 6:
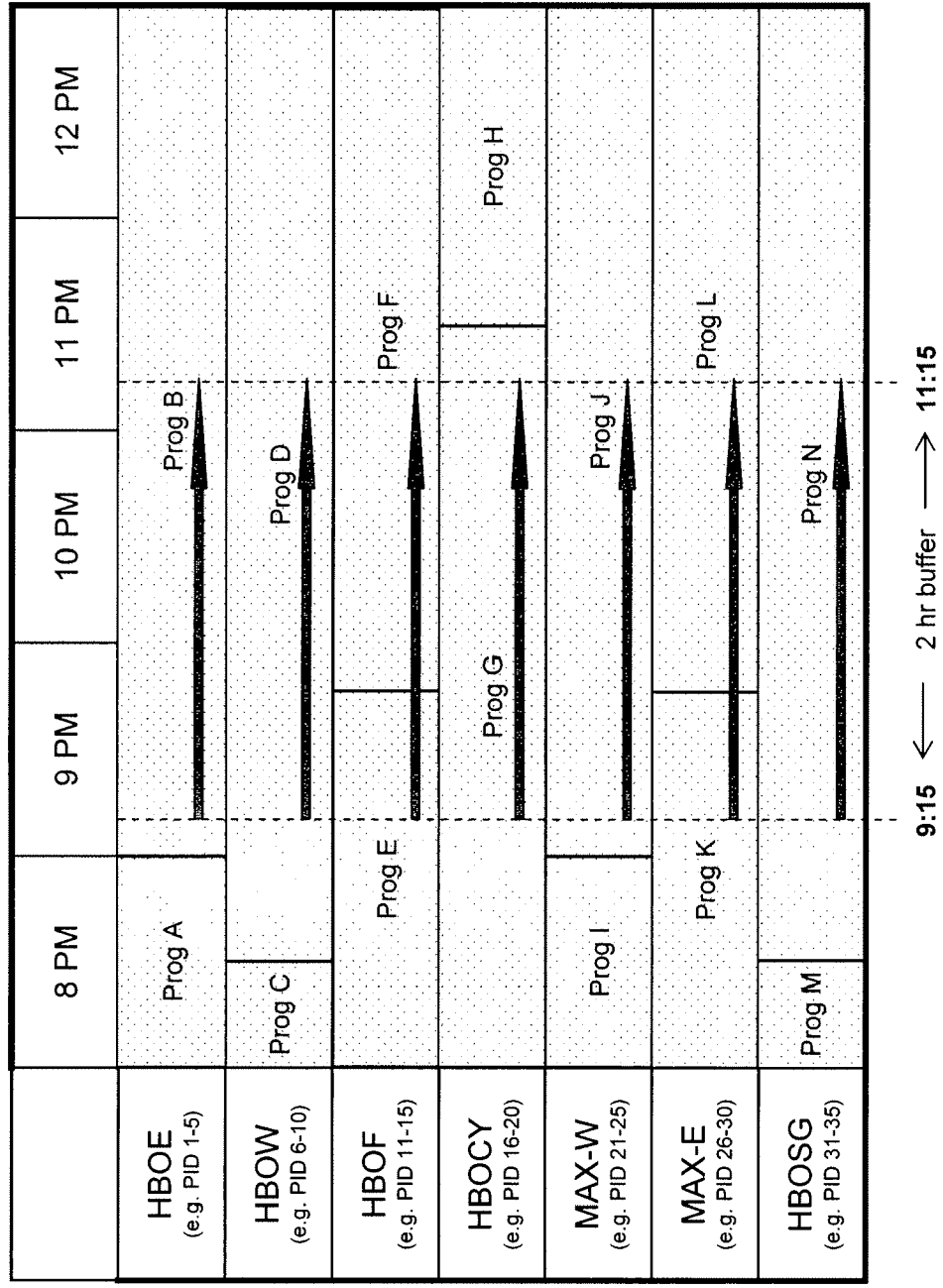
FIG. 6 illustrates operation of one embodiment which employs a buffer of a specified duration.

Storing content from multiple channels/streams on the mass storage device 360 in the foregoing manner provides numerous advantages over prior systems. More specifically, one embodiment of the invention uses the content stored in the multi-stream buffers 360, 361 to provide trick modes and other short term storage functions for all channels within the statistically-multiplexed group. For example, if a two-hour multi-stream buffer 361 is established, as indicated in the program guide 600 shown in FIG. 6, a user may pause any channel for up to two hours or rewind any channel back two hours (e.g., at 11:15 PM the user can rewind any channel back to 9:15 PM). Accordingly, if the user watching Program B on HBO East (PIDs 1-5 in the example) at 11:15, and decides to watch Program F from the beginning on the HBO Family channel (PIDs 11-15 in the example), and indicates so by choosing Program F via a remote control device or cursor control device, selection logic 350 will direct the PID filter module 340 to extract Program F from the multi-stream buffer 361. In this manner, the user will be able to view Program F in its entirety even though the broadcast of Program F started approximately 1½ hours earlier. Similarly, users may select programs on any of the other channels (e.g., Program L on Cinemax® East) broadcast up to two hours earlier. It should be noted that a two-hour buffer is described above merely for the purpose of illustration. Various alternate buffer sizes may be employed while still complying with the underlying principles of the invention.

Figure 4:
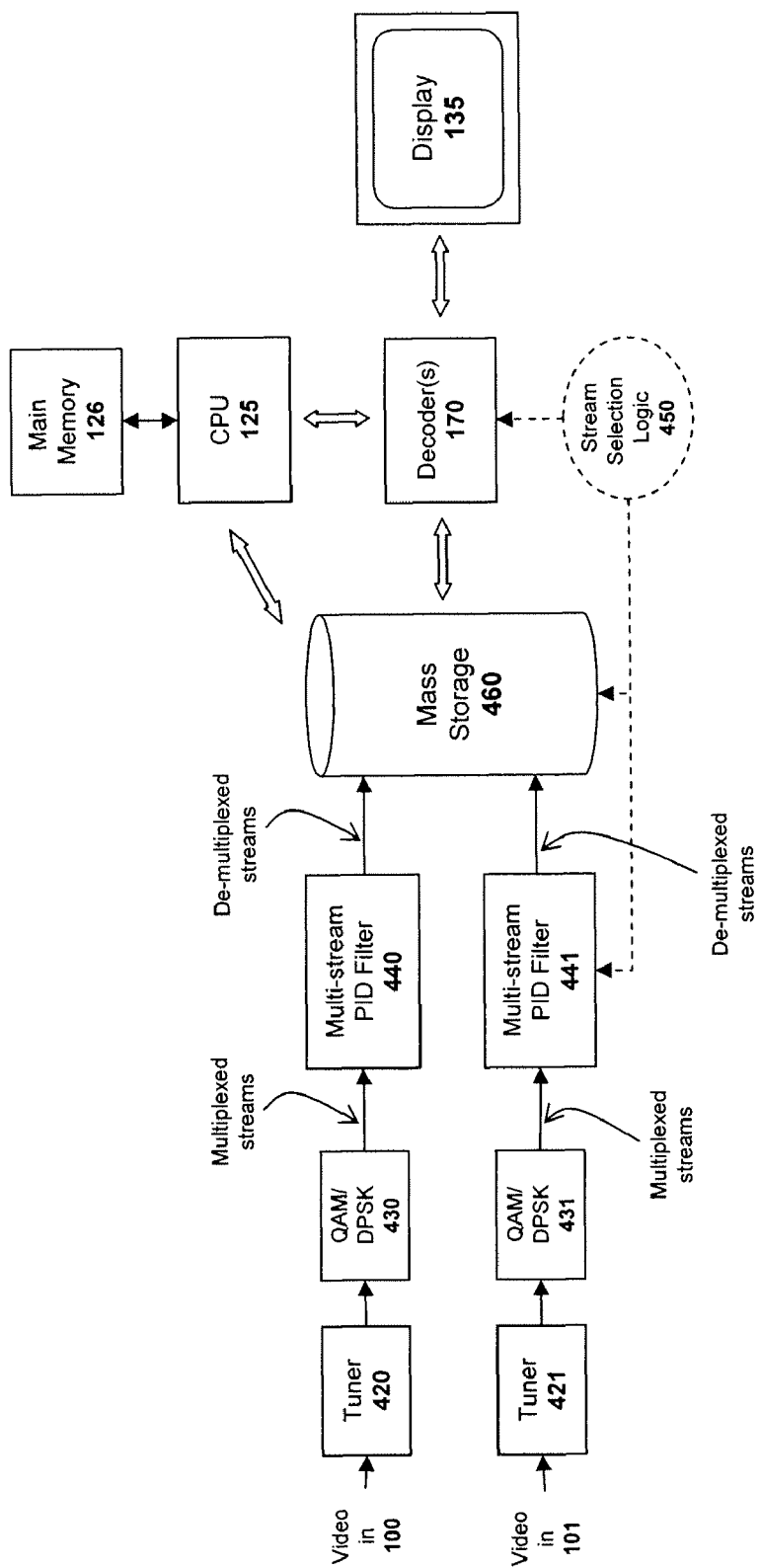
FIG. 4 illustrates an embodiment of a system for storing and processing multiple broadcast multimedia streams wherein the streams are demultiplexed before being stored.

One embodiment of the invention demultiplexes the incoming multimedia streams before storing them to a multi-stream buffer on the mass storage device 460. As illustrated in FIG. 4, this embodiment includes one or more multi-stream PID filter modules 440, 441 which extract the multimedia streams from the multiplexed signal and store them on the mass storage device 460 separated from one another. Thus, as illustrated in greater detail in FIG. 5, if the input to PID filter module 441 is a set of 'n' multiplexed streams, then the output will be 'n' independent, demultiplexed streams stored in a demultiplexed multi-stream buffer 502. Storage buffers 445, 446 may be used by each of the multi-stream PID filters 440, 441, respectively, to construct a portion of each stream (e.g., several Kbytes) before storing the portion to the mass storage device 460. This will avoid excessive seeking of the mass storage device 460 (e.g., which would result if the storage device 460 were configured to write a small amount of data such as a single PID packet for each stream at a time).

Selection logic 550, responsive to a user request to view a particular program (e.g., via remote control and/or cursor control device), will direct the decoder module 171 to read and decode one of the streams (i.e., the streams associated with PIDs 2-3 and 101-102 in the example) for rendering on a television or other display device 136. The same operations may be performed on a separate group of 'm' multiplexed streams extracted by multi-stream PID filter module 440.

Figure 5:
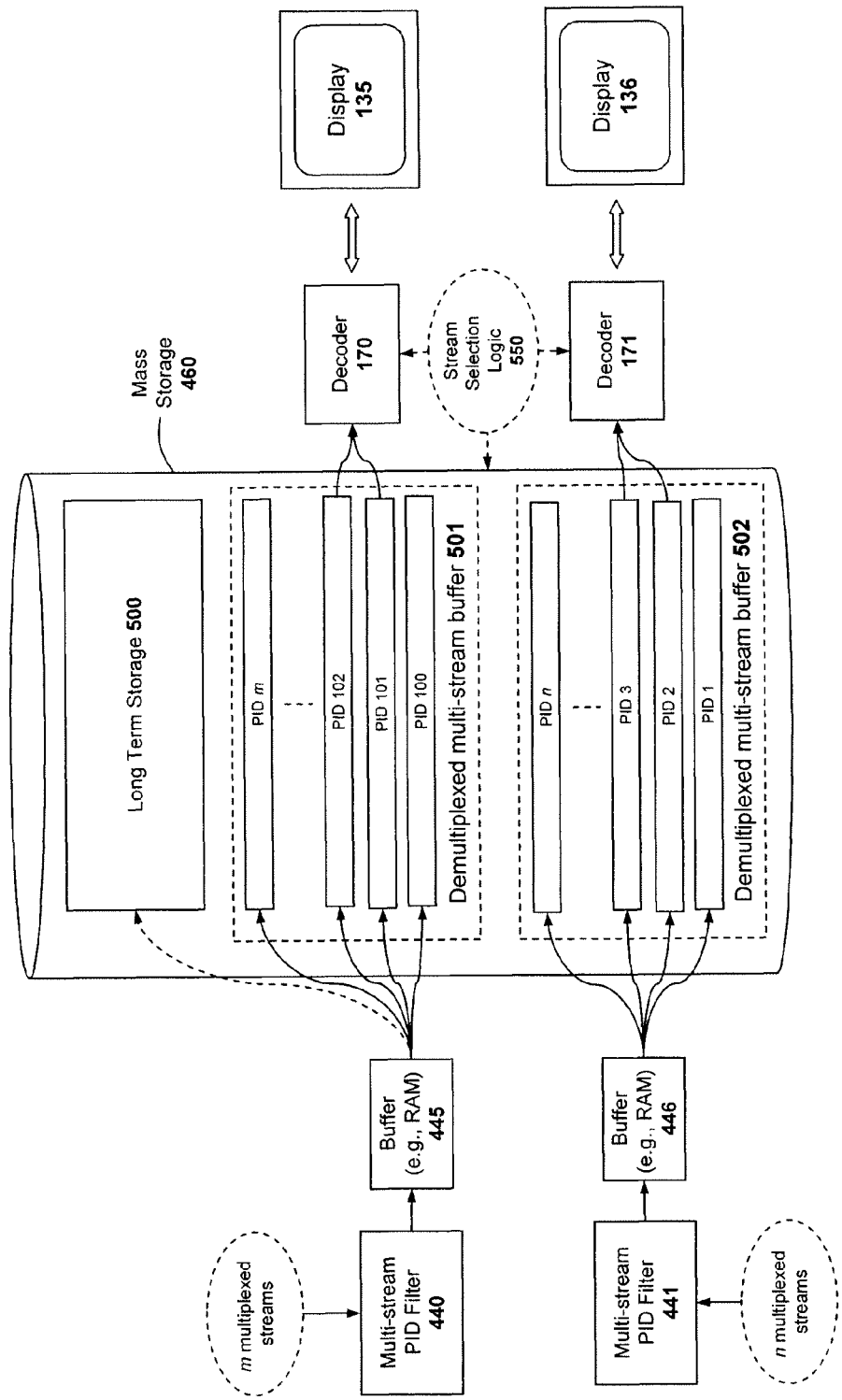
FIG. 5 illustrates more detail of an embodiment of a system for storing and processing multiple broadcast multimedia streams wherein the streams are demultiplexed before being stored.

As indicated in FIG. 5, each of the embodiments described herein may also employ a long term storage buffer 500 for recording programs specified by a user (e.g., similar to the long-term recording functionality of a VCR). In one embodiment, if a user selects a program for recording while the program is already in progress, the program content already stored in one of the demultiplexed multi-stream buffers will be transferred to the long term storage buffer 500 as well as any new program content. Alternatively, or in addition, the program content may simply be reclassified as long term storage content by changing the classification of its directory entry on the storage device rather than moving the content itself.

Figure 7:
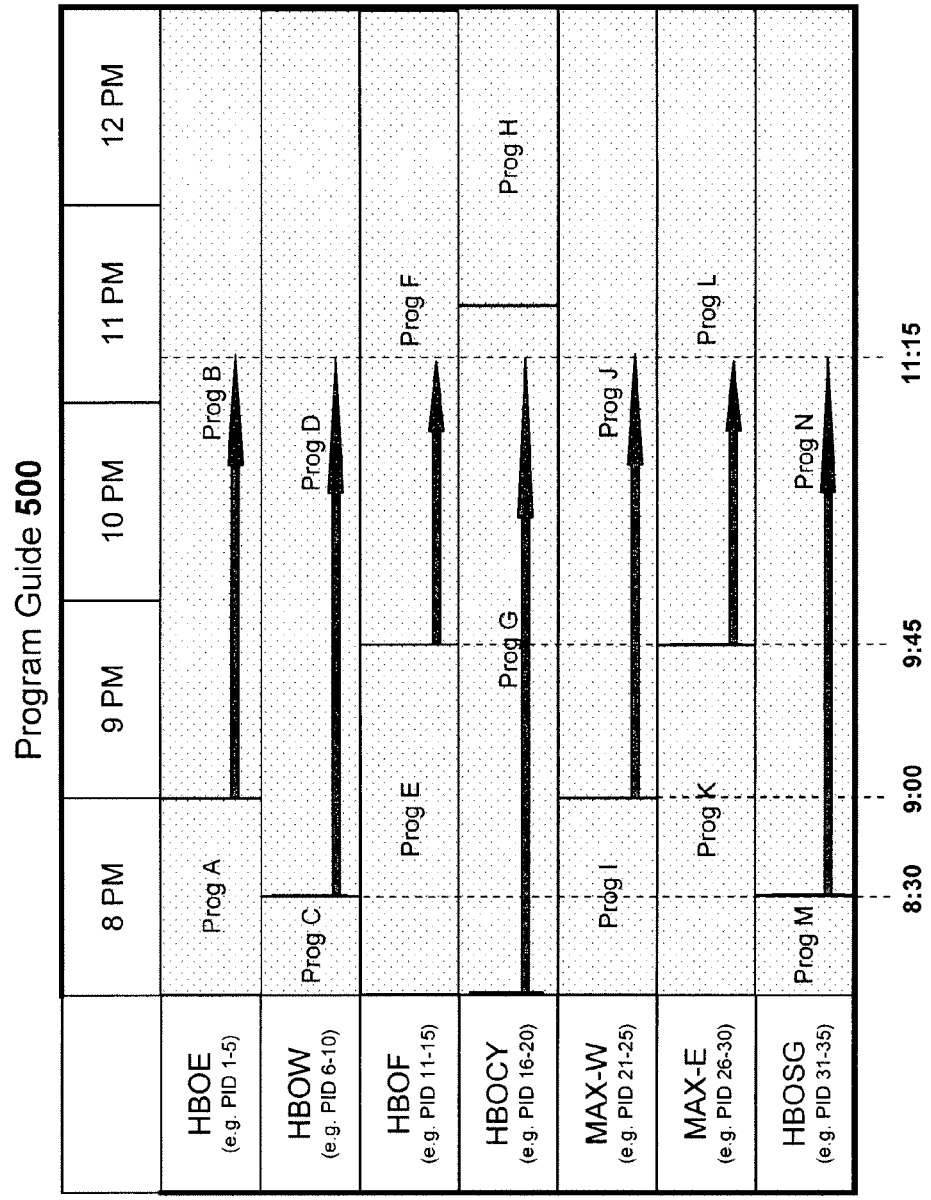
FIG. 7 illustrates an embodiment in which a user may watch any program currently being broadcast from the beginning.

One benefit of separating the streams before storing them in the foregoing manner is that, in one embodiment, a user will be able to watch any program currently being broadcast from the beginning (i.e., the system will record back on each channel to the last complete program). Thus, as illustrated in the program guide 500 of FIG. 7, at 11:15 a user may watch program N on HBO Signature (PIDs 31-35 in the example) from the beginning even though the program started at 8:30. Similarly, the user may watch each of programs B, D, F, G, J and F from start to finish.

In one embodiment, a user may configure different buffer sizes for different channels. For example, a user who regularly watches a number of shows on HBO may decide to establish a large (e.g., 6 hour) buffer for that channel (e.g., by programming the system using a remote control, mouse or other cursor control device), whereas the same user may configure smaller buffers for channels which the user does not watch regularly (e.g., CSPAN). In one embodiment, the system will actively monitor the user's preferences and set larger buffer sizes based on which channels the user views the most frequently and/or the times/days during which the user views the channels. Various other buffer configuration schemes may be employed while still complying with the underlying principles of the invention.

It should be noted that various system functions described herein (e.g., the selection logic 350, 450, 550 used to select a particular multimedia stream; the PID filtering; the buffer settings; ... etc) may be embodied in software executed by the CPU 125. Alternatively, or in addition, these functions may be embodied in any combination of hardware (e.g., an application-specific integrated circuit ("ASIC")), software and/or firmware while still complying with the underlying principles of the invention.

Figure 8:
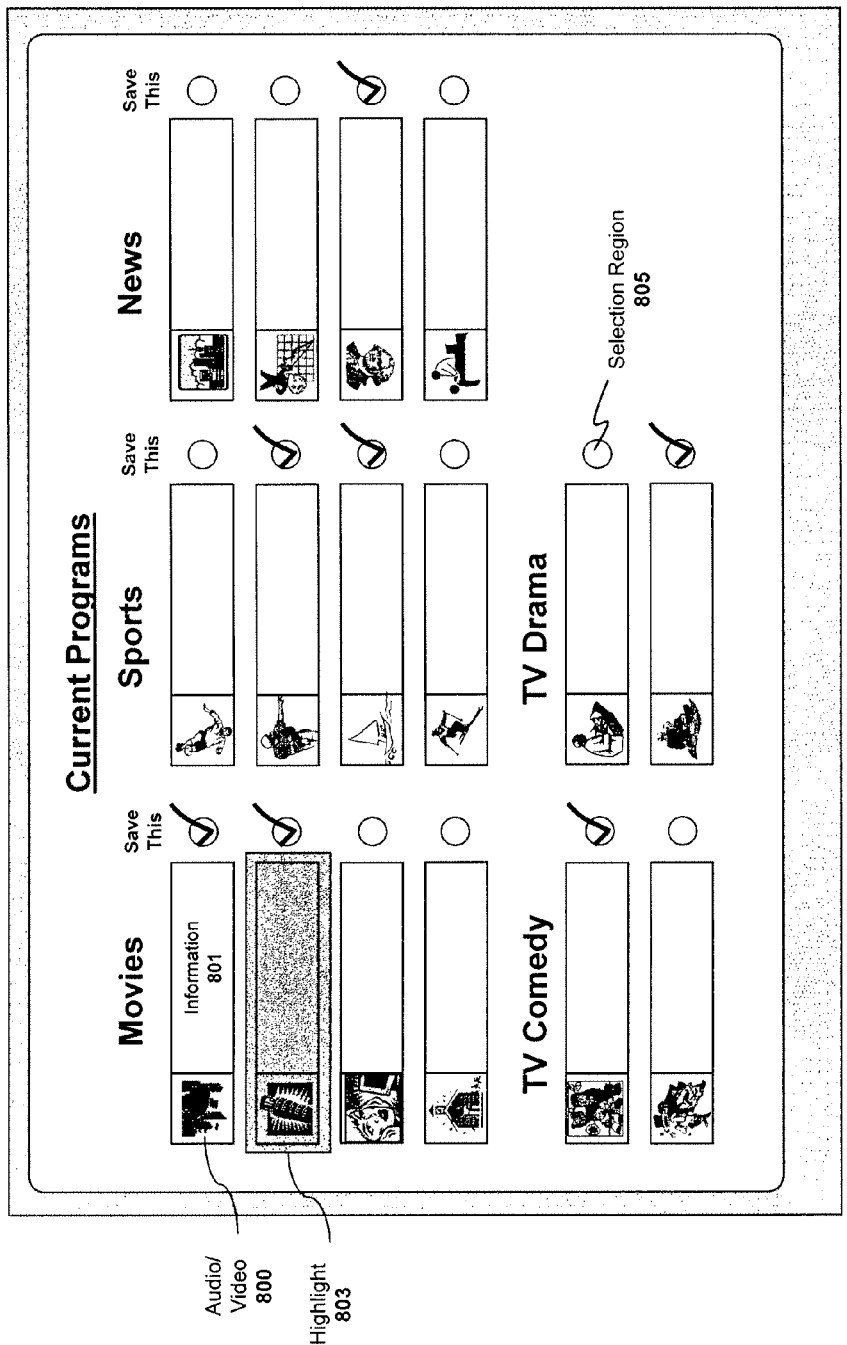
FIG. 8 illustrates a graphical user interface for selecting programs from a program guide and/or acquiring additional program-related information according to one embodiment of the invention.

Using the improved buffering techniques described above, one embodiment of the invention provides users with a listing of all currently available programs from which they may select (e.g., those programs which may be viewed in their entirety). As illustrated in FIG. 8, one embodiment of the program listing is provided in the form of an interactive graphical user interface ("GUI"). The user may select a particular program listing by moving a highlight bar 803 through the listings using a cursor control device such as a remote control, keyboard or mouse. When the highlight bar 803 is highlighting the program entry which the user wishes to view, the user may select the program entry by clicking the enter key on the keyboard/remote or the select button on a mouse.

Each program entry in the particular embodiment illustrated in FIG. 8 includes a video portion 800 and an informational portion 801. The video portion in one embodiment is a thumbnail of the actual video content provided over the cable/satellite channel. For example, if the first entry in the program list shown in FIG. 8 is HBO, then the video portion 800 of the entry will contain actual HBO video content. As a user moves through the various program entries, in one embodiment, the audio associated with that entry will also be generated. Moreover, in one embodiment, the system will display various types of user-specified broadcast content including, for example, live content (i.e., the program as it is currently being broadcast by HBO), recorded content (e.g., the first few minutes of the movie), or previews of the program (e.g., movie trailers). The underlying principles of the invention remain the same regardless of the type of content transmitted to the video portion 800 of the program entry.

Rendering audio/video content from each of the cable/satellite channels is simplified using embodiments of the present invention because the full set of multiplexed streams/channels are transmitted to the mass storage device and are accessible by the decoder modules 170, 171. Such a configuration was not possible in prior systems which only transmit one or two de-multiplexed streams to the mass storage device and decoder modules.

In one embodiment, a selection region 805 will be provided for each program entry. If a user decides that he/she would like the program entry associated with the selection region 805 to be saved, the user may simply place a check mark (or other mark) in the selection region corresponding to that entry using a remote control or other cursor control device. The system will then store the program in long term storage and/or reclassify the content as long term content as described herein. If the embodiment shown in FIG. 3 is employed, one embodiment of the invention will depacketize/demultiplex the selected program and save the program back to the mass storage device 360 (e.g., in either a packetized or a depacketized format). If the user does not wish to view the program immediately, this operation may be accomplished as a background task using the PID filters 340, 341 or other extraction software executed on the CPU 125.

The information portion 801 of the program entry may include various types of program-related data including, for example, the title and year of the movie (if the program is a movie), program reviews, and/or actors in the program, to name a few. In one embodiment, the program-related data includes links to additional information. For example, the links may be network addresses such as uniform resource locators ("URLs") which point to additional data stored on a network (e.g., the Internet). In response to a user selecting a URL (e.g., via a cursor control device), additional data addressed by the URL may be downloaded to the system and displayed to the user. Accordingly, this embodiment of the system is equipped with a modem or other device for providing two-way communication over the Internet or other network (e.g., the cable/satellite provider's network). Various types of modems may be employed including digital subscriber line ("DSL") modems, cable modems, and plain old telephone system ("POTS") dial up modems (i.e., depending on the particular type of communication channel used by the system). Of course, the type of modem used to support interactive communication is not pertinent to the underlying principles of the invention.

Wideband Implementations

Figure 9:
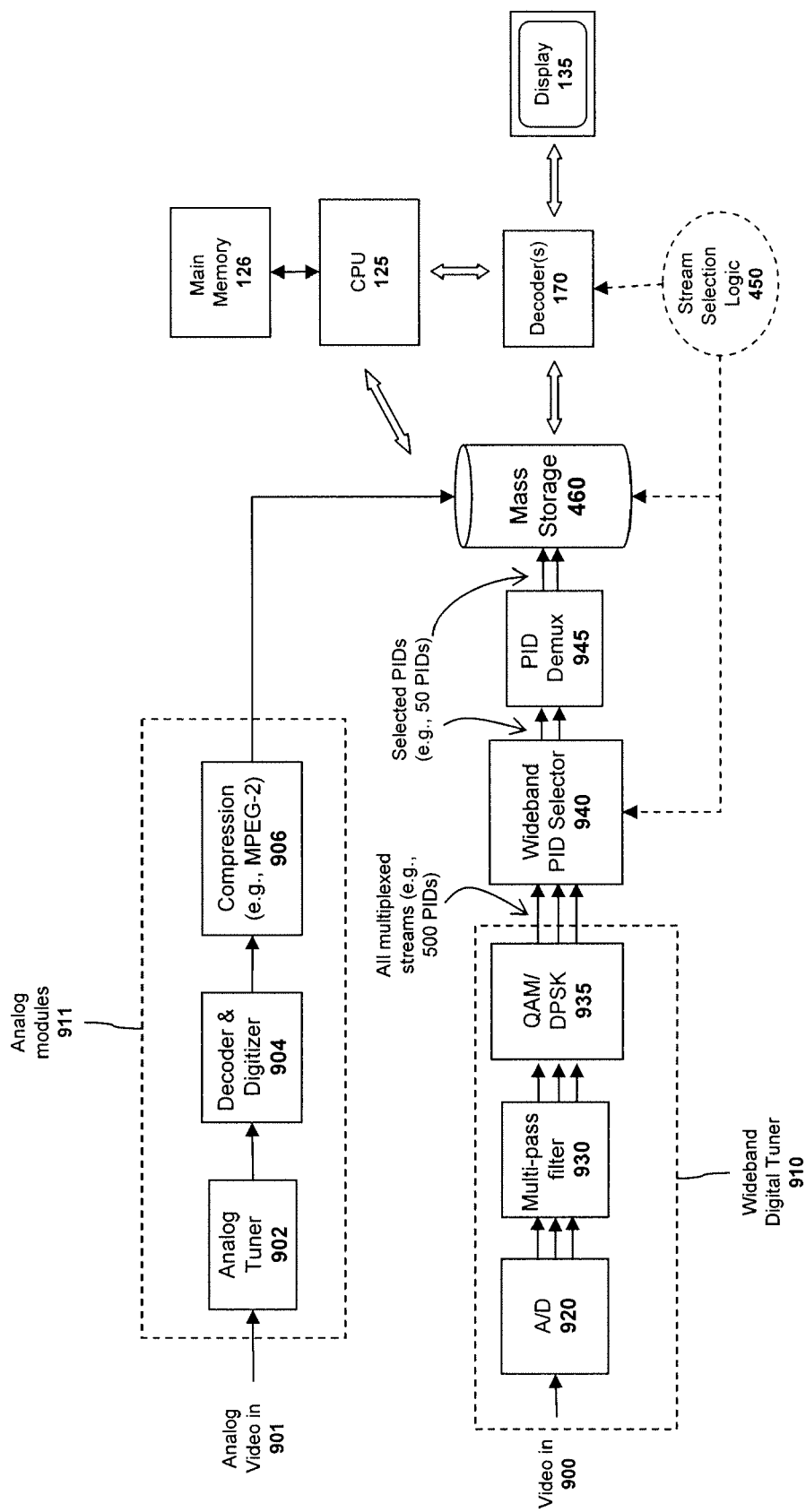
FIG. 9 illustrates a wideband implementation according to one embodiment of the invention.

In one embodiment of the invention, illustrated in FIG. 9, a wideband tuner 910 is configured in to lock on to several groups of multiplexed streams at once as opposed to just a single group. In the illustrated embodiment, the wideband tuner 910 is comprised of an analog-to-digital ("A/D") converter 920 for receiving and digitizing numerous incoming streams—potentially all streams transmitted by a particular cable/satellite provider (e.g., over a 1 GHz frequency range); a multi-pass filter 930 which divides the digitized wideband signal into a plurality of discrete frequency bands (e.g., bands of 100 MHz); and a wideband QAM/DPSK module 935 which individually demodulates the content from each of the discrete frequency bands to reproduce all of the multiplexed multimedia streams. In one embodiment, the QAM/DPSK module 935 is comprised of a series of digital signal processors ("DSPs") (e.g., one DSP per frequency band), each programmed with a QAM function for performing QAM demodulation and/or a DPSK function for performing DSPK demodulation. In addition, the DSPs may perform other functions such as signal equalization and noise filtering. In one embodiment, the DSPs operate under the control of the system's CPU 125 (e.g., the CPD executes software comprising the QAM/DPSK functions).

All of the groups of multiplexed streams (which, as indicated in FIG. 9, may include 500 or more PIDs), are transmitted through a wideband PID selector 940 which, in response to selection logic 450, selects a subset of all the multiplexed PIDs for storage on the mass storage device 460. The particular number of PIDs selected by the PID selector 940 may vary depending on the preferences of the user and/or the capabilities of the mass storage device 460 (e.g., the device's bandwidth and storage capacity). For example, in one embodiment, users may be prompted to select a set of "favorite" channels to be continually buffered on the mass storage device 460 (whereas the user's non-"favorite" channels will not be buffered, or will only be buffered for a limited time period). To support the increased storage and bandwidth requirements of the several sets of additional streams, one embodiment of the invention includes one or more additional mass storage devices (e.g., connected through a multi-drive high speed communication interface such as UDMA or SCSI).

In one embodiment, a PID demultiplexer 945 demultiplexes/depacketizes the streams selected by the wideband PID selector before storing them on the mass storage device 460. Alternatively, or in addition, the streams may initially be stored in a multiplexed format on the mass storage device and the PID depacketizer 945 may extract PID packets only when a user decides to watch/record a particular program (e.g., as described above with respect to the embodiment shown in FIG. 3). Once selected by a user, the stream is then transmitted through a decoder module 170 for MPEG-2 decoding (or other type of decoding, depending on how the stream was initially encoded) and to a display 135. Although illustrated above as two separate modules, it will be appreciated that the functionality of the PID demultiplexer 945 and wideband PID selector 940 may be combined within a single module.

In one embodiment, a separate set of analog modules 911 may be included in the system to process and store legacy analog broadcasts. The analog components may include an analog tuners 902 for receiving the analog broadcast at a particular frequency, a decoder/digitizer module 904 for decoding and performing A/D conversion on the analog signal, and a compression module 906 for compressing the signal before storing it to the mass storage device 460.

In one embodiment, the digital components may be configured to provide the analog functionality just described. For example, the DSPs within the QAM/DPSK module 935 may be programmed with an NTSC or PAL demodulation function for demodulating the incoming analog signal 901 (i.e., after the signal is digitized via the A/D converter).

Conditional Access Embodiments

In order to prevent users from viewing multimedia content which they do not have the right to view (e.g., subscription based channels, pay-per-view channels, . . . etc) the multimedia content is frequently encrypted using a series of encryption keys before being transmitted. Accordingly, multimedia systems are generally equipped with conditional access ("CA") subsystems for decrypting the incoming multimedia content.

Figure 10:
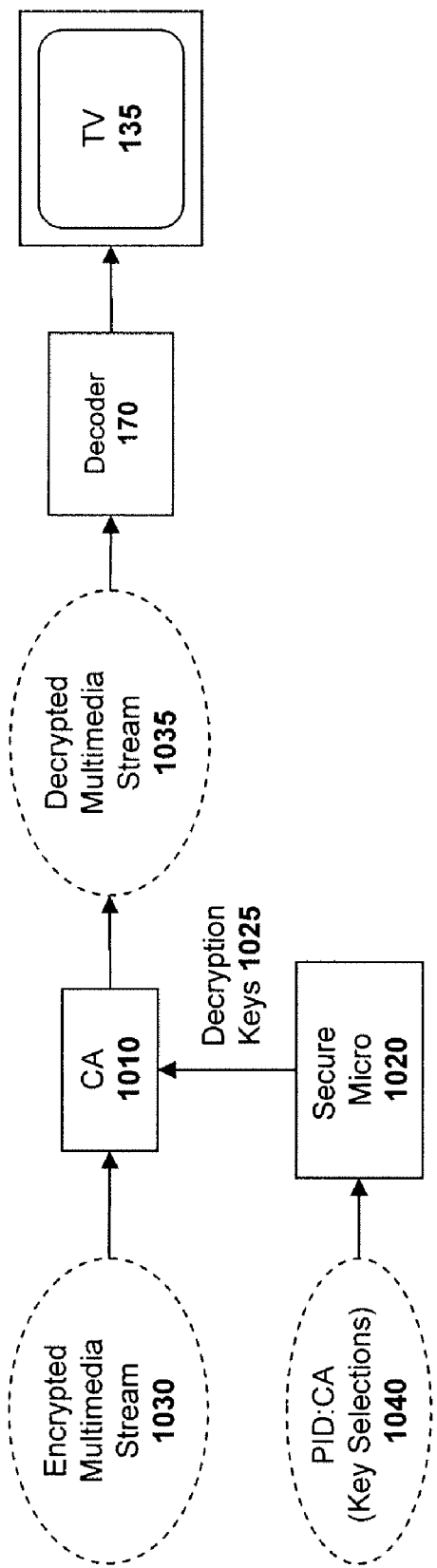
FIG. 10 illustrates operation of a conditional access module and a secure micro unit.

FIG. 10 illustrates a CA module 1010 decrypting an incoming multimedia stream 1030 to produce a decrypted multimedia stream 1035, which is then decoded by decoder 170 (e.g., using an MPEG-2 decoder) and rendered on a television display 135. The decryption keys 1025 used to decrypt the multimedia content are transmitted to the CA module 1010 from a secure micro unit 1020. Because the keys used to encrypt the multimedia stream typically change every few seconds, these key changes must be synchronized at the secure micro 1020 and CA modules 1010. Accordingly a key selection data stream 1040 (also referred to herein as the "PID:CA" stream or "conditional access data") is provided to the secure micro unit 1020 so that it knows precisely which key to transmit to the CA module 1010 at a given point in time.

As a result of the CA subsystem, if the incoming multimedia stream is stored in an encrypted format on a mass storage device, the decryption key changes associated with that multimedia stream must also be stored (i.e., so that when a user selects the stream, the secure micro will provide CA module with the decryption keys required to decrypt the stream). Prior systems deal with this problem simply by decrypting the multimedia stream before it is stored. However, storing decrypted content on a long term storage device in this manner leaves the copyright holder of the content exposed to unauthorized copying. In addition, because CA subsystems are typically only capable of decrypting one stream at a time, this configuration only provides for storage of only a single stream per CA module.

Figure 11:
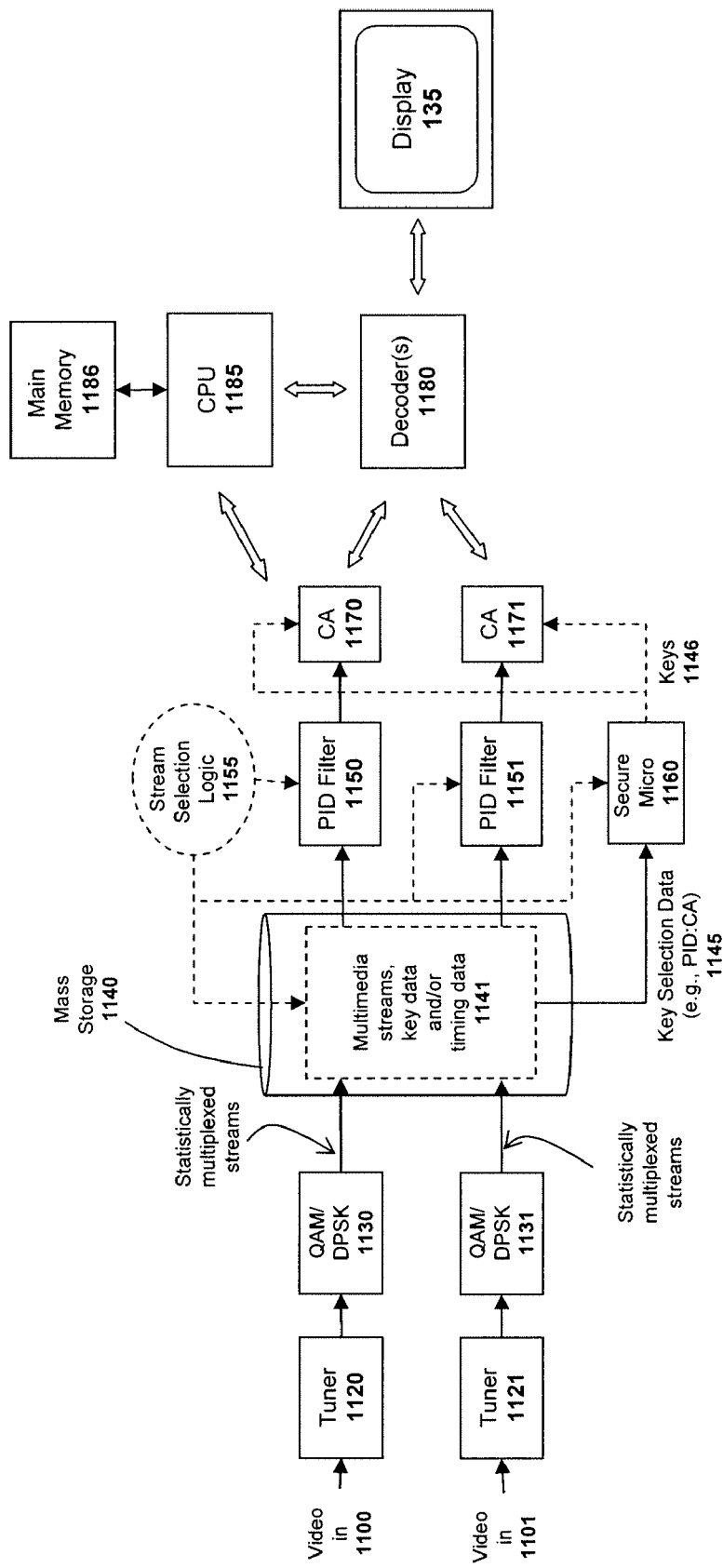
FIG. 11 illustrates a system for processing multiple multimedia streams and associated conditional access data.

One embodiment of a system for concurrently processing decryption keys for multiple streams is illustrated in FIG. 11. Like prior embodiments, this embodiment includes one or more tuners 1020, 1021 for locking on to multimedia stream within a specified carrier frequency and one or more QAM and/or DPSK demodulators 1030, 1031 for demodulating the multimedia stream.

Unlike prior systems, however, the illustrated embodiment stores the PID:CA key selection data 1145 identifying the keys 1146 to be supplied by the secure micro 1160 to the CA modules 1170, 1171 for each multimedia stream, as well as timing data indicating the points in time at which each portion of the multimedia stream and associated key selection data 1145 were received/stored on the system (or alternatively, the points in time at which the stream/content was transmitted). When a user subsequently chooses a particular multimedia stream for playback, the secure micro 1160 uses the key selection data PID:CA 1145 for that stream to provide the correct series of keys to the CA modules 1170, 1171 for decryption of the selected stream. As in the embodiments described above, the user may be able to watch any program stored on the mass storage device for a predetermined buffer period or from the beginning (e.g., as described above with respect to FIGS. 6 and 7, respectively). In one embodiment, stream selection logic 1155 (embodied in hardware or software executed by the CPU 1185) will select the correct multimedia stream and PID:CA stream at the correct point in time (e.g., using techniques described in greater detail below) responsive to the user's selection (e.g., via a remote control or a cursor control device). Once the multimedia stream is decrypted by one of the CA modules 1170, 1171, one or more decoder modules 1180 then decode the stream using an appropriate codec (e.g., MPEG-2) and transmit the decoded stream to a display 135.

Figure 12:
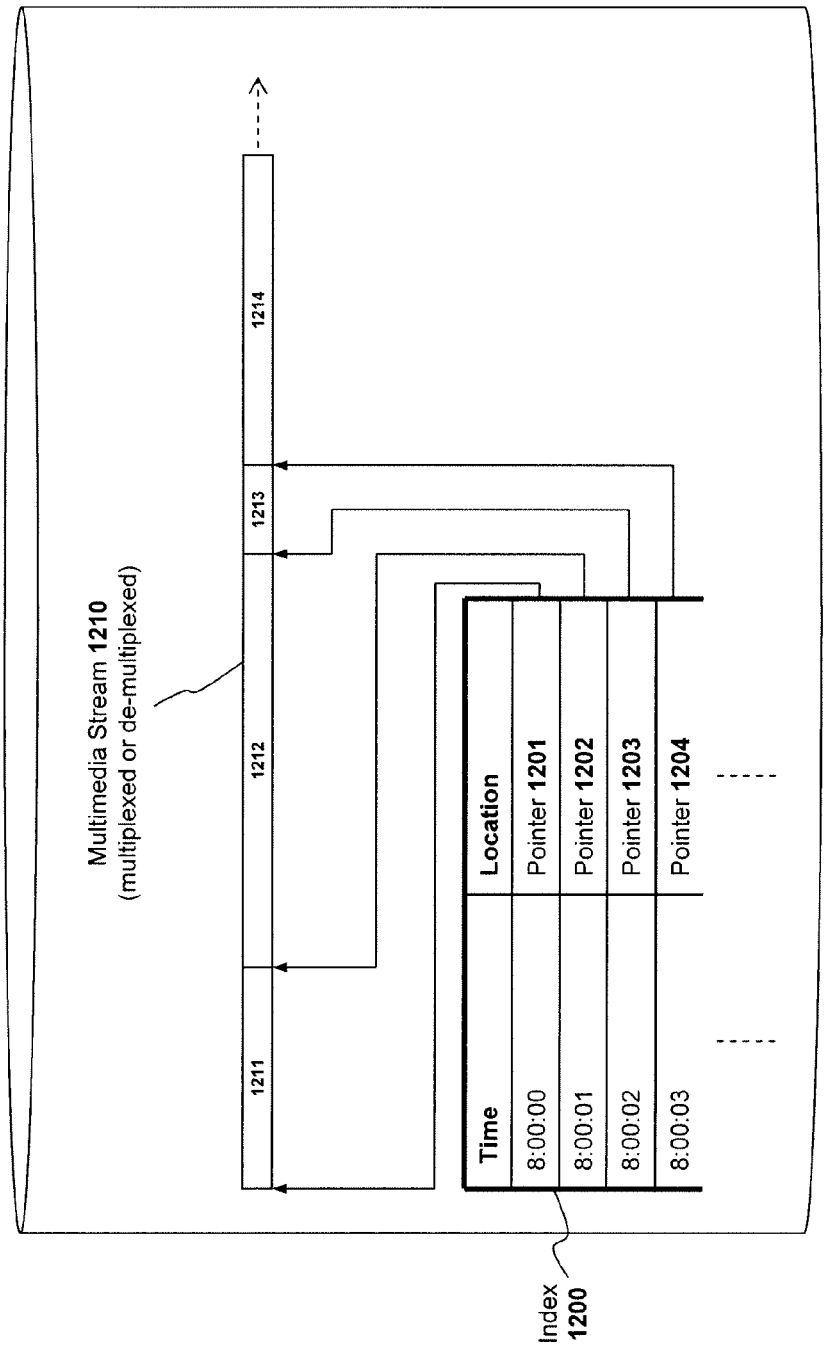
FIG. 12 illustrates a timestamp index employed in one embodiment of the invention.

Identifying the correct points in time within the multimedia stream to begin playback is complicated by the fact that MPEG-2 data (as well as other types of encoded multimedia content) is not typically received by the system at a steady rate. For example, a portion of an MPEG-2 stream which contains significant movement between each of the image frames (e.g., a video of an explosion) will typically consume significantly more bandwidth than a portion of an MPEG-2 stream that contains little or no movement. Thus, as illustrated in FIG. 12, four 1-second portions (1211, 1212, 1213, 1214) of the incoming multimedia stream 1210 may occupy different amounts of space on the mass storage device. As such, in one embodiment of the system, an index of timing data 1200 is provided so that the stream selection logic 1155 can accurately locate where on the hard drive to start decrypting/rendering the multimedia stream in response to a user request to play back a particular program. Included within the index 1200 is a series of address pointers 1201-1204, each associated with a timestamp (labeled 8:00:00 through 8:00: 03). In operation, if a user selects a stored program which started at 8:00, for example, the stream selection logic 1155 will identify the 8:00:00 timestamp within the index 1200 and will start decrypting/playing the program stream back from the address identified by pointer 1201.

In one embodiment, the stream selection logic 1155 will also identify the appropriate point within the PID:CA stream from which to read the necessary key changes. In one embodiment, a separate set of pointers to the PID:CA stream may be included within the timestamp index 1200 or, alternatively, within a separate PID:CA index (not shown). Alternatively, the conditional access data PID:CA may be stored directly within the index 1200. However, in an embodiment in which the PID:CA stream is not encrypted and/or is transmitted at a steady rate (e.g., 0.1 Mbit/sec), address pointer entries to the PID:CA stream may not be required (i.e., the selection logic will be able to accurately identify where to read from the PID:CA stream without the need for an index).

In one embodiment, the timing index 1200 is transmitted along with the multiplexed multimedia streams in the form of an additional PID stream (e.g., a PID:INDEX stream transmitted from the head-end or uplink satellite that feeds the head-end). In other words, in this embodiment, the organization providing the source material (e.g., the cable or satellite provider) will generate and transmit the index to the end user's system.

However, if the content provider does not transmit the index, one embodiment of the system will construct the index 1200 as the multimedia streams are received and written to the mass storage device. For example, index/timestamp generation logic executed by the CPU 1185 (or embodied in hardware) may be configured to generate a new timestamp entry every $1/100$ of a second and continuously store the results to the mass storage device 1140. However, it should be noted that the particular frequency with which timestamp entries are generated is not pertinent to the underlying principles of the invention.

Figure 13:
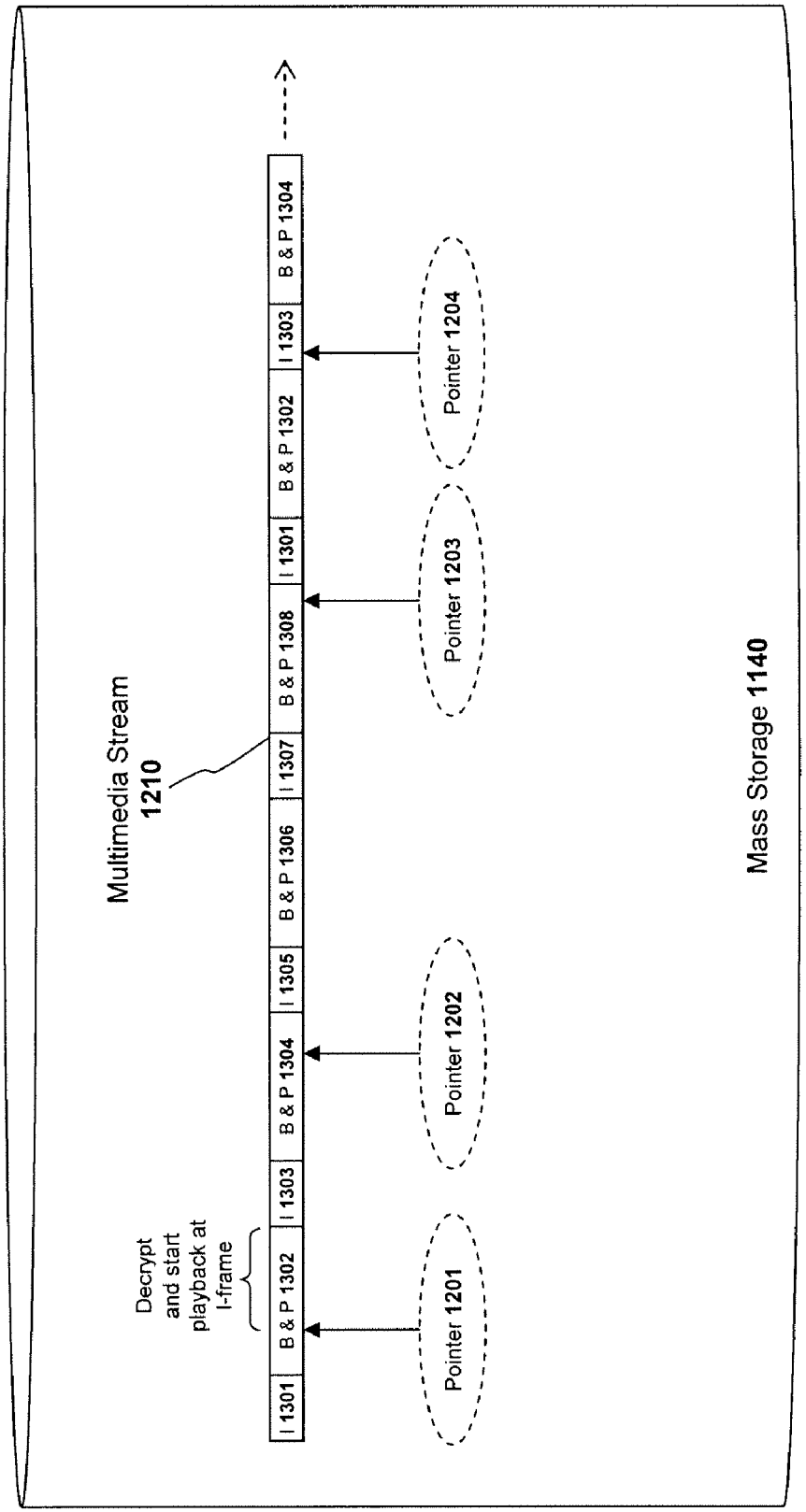
FIG. 13 illustrates techniques for identifying I-frames within a multimedia stream.

As illustrated in FIG. 13, an MPEG-2 stream 1310 is comprised of a series of I-frames separated by B-frames and P-frames. MPEG-2 uses similar DCT-based intraframe coding as the JPEG standard for each of the I-frames, but compresses the intervening video content by encoding only the differences between periodic I-frames within the B-frames and P-frames. Accordingly, it would be preferable if the pointers 1201-1204 contained in the timestamp index 1200 pointed to I-frames within the MPEG-2 stream rather than B or P frames (i.e., because the B and P frames are meaningless outside of the context of the two I-frames they connect). Accordingly, if the timestamp index is generated by the organization providing the source material, each of the pointers 1201-1204 should be selected to point to I-frames within the MPEG-2 stream.

If, however, the timestamp index 1200 is generated by the system, as described above, then the pointers 1201-1204 may not necessarily point to an I-frame. Accordingly, in one embodiment of the invention, if a stream is played back from an address pointer which does not point to an I-frame (e.g., such as pointer 1201 in FIG. 13) then it will decrypt/decode the stream up until it reaches an I-frame and will begin playback from that point. For example, in FIG. 13, the system will begin decrypting the stream at the point identified by pointer 1201 (in the middle of B & P frames 1302) but playback would not start until the decryption process reached I-frame 1303. In one embodiment, the system identifies the I-frame 1303 by decrypting its I-frame header.

Similar techniques may also be employed to allow users to fast-forward through the multimedia content. More specifically, in response to a fast forward command, one embodiment of the system will display a series of I-frames in succession. Depending on the speed at which the fast forward is set to, this embodiment may jump several I-frames at once (as described in greater detail below). If the timestamp index described above contains pointers which point directly I-frames, then the I-frames will be identified directly via the index.

Figure 14:
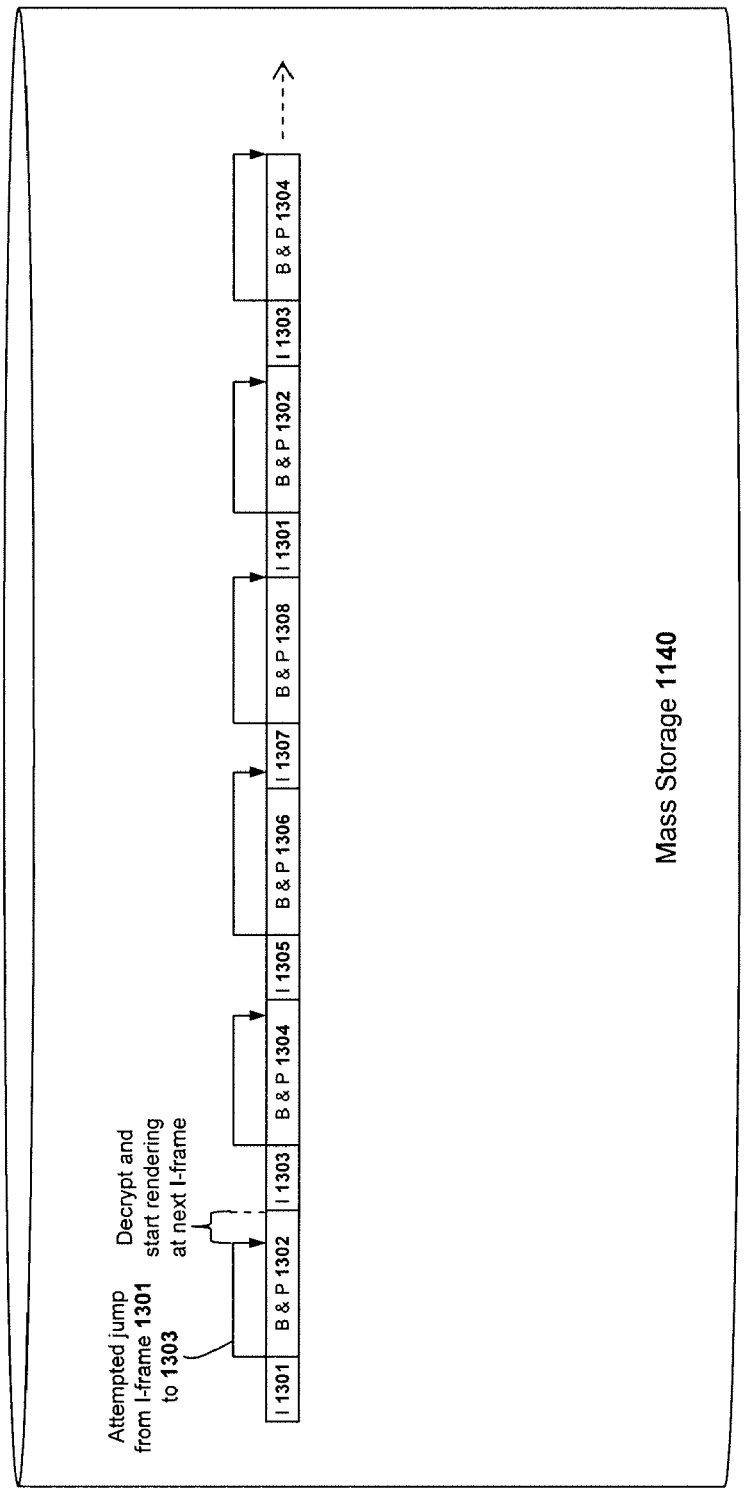
FIG. 14 illustrates operation of a fast forward function according to one embodiment of the invention.

If, however, the index is constructed as the multimedia stream is received, then jumping from one I-frame to the next may not be entirely accurate because the number of B and P frames between each I-frame and the data contained within each B and P frame is not consistent. Accordingly, as illustrated in FIG. 14, when a user selects fast forward, one embodiment of the system will estimate the jump from the current I-frame 1301 to the next I-frame 1303 based on the speed of fast forward request and/or the estimated time between each I-frame. In one embodiment, the system will perform a lookup in the timestamp index 1200 to make the jump. Alternatively, or in addition, the jump may be based on the assumption that during standard playback, a new I-frame is decided approximately every ½ second. The underlying principles of the invention remain the same regardless of how the jump to the next I-frame is estimated.

Regardless of how the jump is estimated, once it occurs, one embodiment will then begin decrypting the stream using the decryption key data PID:CA 1145 associated with that point in time, until the decryption process reaches the desired I-frame 1303. Once the I-frame 1303 is reached, it is decrypted, decoded and rendered on the display. The same techniques may then be employed for the estimated jump to the next I-frame 1305. The system may identify each of the I-frames by decrypting their respective I-frame headers.

If one embodiment, if the jump lands in the middle of the next I-frame as illustrated in FIG. 14 (as the jump from I-frame 1305 to 1307, then one embodiment of the invention will decrypt the stream backwards until it reaches the beginning of I-frame 1307. The system may identify the middle of an I-frame by the presence of I-frame data rather than B or P frame data (e.g., DCT intra-frame data rather than inter-frame motion data).

If the speed of the fast forward request is set high enough the secure micro unit 1160 may be required to provide a new decryption key with each jump. Accordingly, one problem which may result is that the secure micro 1160 may not be capable of providing decryption keys to the CA module 1170 quickly enough (e.g., the secure micro may only be capable of supplying a new key every ⅓ second). If this is the case, then one embodiment of the invention will continue to display the current I-frame until a new key can be generated as it jumps over several I-frames at a time. In this manner, decryption will take place as quickly as the secure micro unit 1160 can generate new keys.

As the multimedia stream is decrypted during playback, one embodiment of the invention will store the decrypted stream back to the mass storage device 1140, thereby replacing the encrypted multimedia data. At this time an I-frame index can be written to the storage device 1140 as well. Accordingly, if a user subsequently decides to rewind to a particular point within the multimedia stream, or decides to watch the program a second time, the foregoing I-frame identification techniques may no longer be required (i.e., because the stream will have been decrypted and an I-frame index may be available). In addition, in one embodiment, as soon as the user begins watching a particular multimedia stream, the system will run ahead of stream playback, decrypting the stream as quickly as it can (generally dictated by how quickly the secure micro unit 1160 can supply keys) and storing the decrypted stream back to the mass storage device. Using this technique an entire movie may be completely decrypted during the first several minutes of playback. Accordingly, if the user subsequently chooses to fast-forward through the movie, the I-frame identification techniques described above will not be required.

In one embodiment, any multimedia programs which the user designates for long term storage (e.g., by checking the selection region 805 corresponding to the program as illustrated in FIG. 8), will be decrypted in the background by software executed on the CPU 1185 and/or using dedicated decryption hardware. This embodiment may be required in cases where the decryption keys provided by the cable/satellite provider expire after a predetermined period of time (i.e., and therefore could not be used to decrypt the multimedia programs after a predetermined time has elapsed).

In order to protect the copyright holders' rights in the multimedia content stored on the mass storage device 1140, one embodiment of the invention will employ additional encryption techniques once the multimedia content has been decrypted. For example, one embodiment of the system delivers a unique key to the mass storage device 1140 as soon as the system is powered up. This technique is available today on many current Ultra-ATA hard drives. If the wrong key is transmitted a predetermined number of times, the hard drive will render the data stored thereon inaccessible (e.g., in one embodiment the hard drive will format itself). Accordingly, an individual who steals the mass storage device 1140 will be unable to access the multimedia content.

In addition, in one embodiment, after the multimedia content is decrypted using keys supplied by the secure micro 1160, one embodiment will re-encrypt the content using one or more known encryption algorithms. For example, in one embodiment, Data Encryption Standard ("DES") encryption will be applied to the multimedia content before storing it back to the mass storage device 1141. As is known in the art, DES is a NIST-standard secret key cryptography method that uses a 56-bit key. It will be appreciated, however, that various other encryption algorithms may be employed while still complying with the underlying principles of the invention. However, one benefit of using DES encryption is that many MPEG-2 decoder chips have the DES encryption function built in (e.g., such as the AViA-9600 from C-Cube Microsystems, Inc). As such, if the system is equipped with an MPEG-2 decoder, no additional hardware will be required, thereby reducing system costs.

Figure 15:
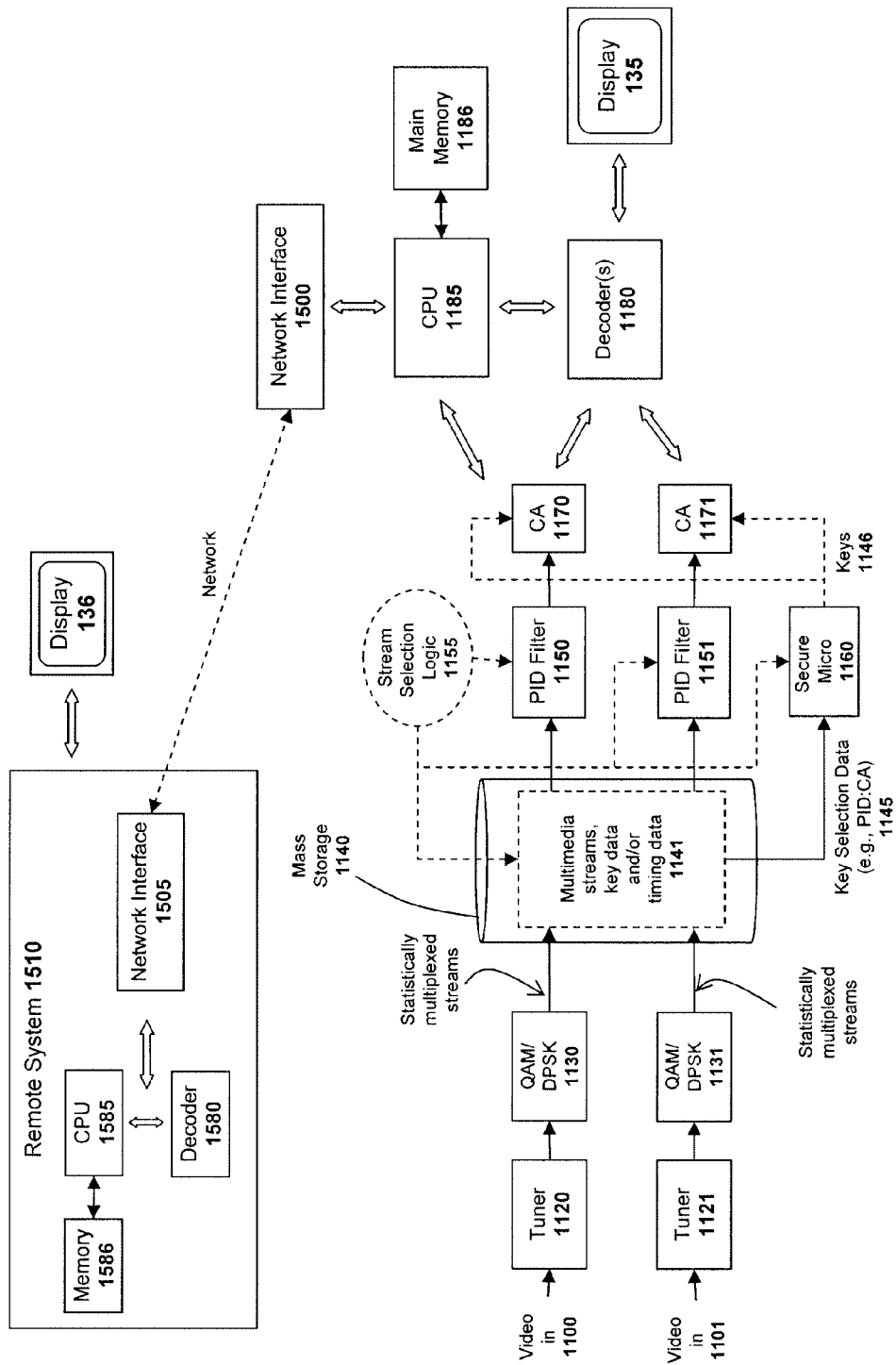
FIG. 15 illustrates an embodiment witch includes one or more remote nodes for processing multimedia content.

In one embodiment, illustrated in FIG. 15, a network interface 1500 is configured in the system to provide communication to a remote multimedia node 1510 (also equipped with a network interface 1505). Various different networking protocols/standards, both wired (e.g., Ethernet) and wireless (e.g., 802.11b), be employed to support the communication between the various nodes.

The format in which multimedia content is transmitted to the multimedia node 1510 may depend on the node's capabilities. For example, in one embodiment, the node 1510 is equipped with its own conditional access module and secure micro unit (not shown). Accordingly, in this embodiment, multimedia streams requested by the remote node 1510 may be transmitted in an encrypted format along with the associated key selection data PID:CA. By contrast, in one embodiment the remote node 1510 may not be equipped with conditional access functionality. As such, in this embodiment, the multimedia content will be decrypted before being transmitted. In order to protect unauthorized access to the multimedia content (e.g., by an unauthorized user listening on the network), one embodiment will re-encrypt the stream before transmitting it to the remote node 1510 using an encryption format which the remote node can employ in real time (e.g., DES encryption). Various other techniques may be used to provide secure communication with the remote node 1510 while still complying with the underlying principles of the invention (e.g., communication may be encrypted using Secure Sockets Layer ("SSL") encryption).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the system and method may be practiced without some of these specific details. For example, although the description above focuses on MPEG-2 as the preferred compression algorithm, various other compression algorithms may be employed to compress/decompress multimedia content while still complying with the underlying principles of the invention (e.g., MPEG-4, RealVideo® 8, . . . etc).

In other instances, well known structures and functions were not described in elaborate detail in order to avoid obscuring the subject matter of the present invention. For example, although not illustrated, it will be appreciated that various levels of buffering may be included in the embodiments described herein. For example, in the embodiment illustrated in FIG. 11, buffers (e.g., SDRAM, RDRAM, . . . etc) may be configured between the QAM/DPSK modules 1130, 1131 and the mass storage device 1140 and/or between the mass storage device 1140 and the PID filters 1150, 1151. In fact, buffers may be provided in this manner between any of the system modules in order to improve system performance. The buffers may be separate, independent modules and/or may be assigned blocks of addressable space within a single unified memory (e.g., a RAM module shared between the CPU 1185 and other system components). The underlying principles of the invention remain the same regardless of which types of buffers are used.

Accordingly, the scope and spirit of the invention should be judged in terms of the claims which follow.

What is claimed is:

1. A method comprising:
   receiving a broadcast signal at a set top box containing a set of multiplexed multimedia channels, the set top box including a temporary storage buffer on a mass storage device;
   storing said multiplexed multimedia channels in the temporary storage buffer on the mass storage device;

if the multiplexed multimedia channels stored on the mass storage device are encrypted, storing a plurality of encryption keys respectively associated with portions of the multimedia channels stored on the mass storage device and timing data associated with the plurality of encryption keys;

determining a point in said temporary storage buffer to begin demultiplexing and decoding a first channel from said multiplexed multimedia channels received at the set top box, said determining being performed responsive to a user request to view a particular program on said first channel, said point indicating the start of said program on said first channel without receiving a user request to return to the beginning of the particular program;

retrieving encryption keys from the mass storage device based upon the point indicating the start of said program; and demultiplexing and decoding and decrypting said first channel of said set of multiplexed multimedia channels received at the set top box using the retrieved encryption keys, the demultiplexing and decoding and decrypting being performed from said point within said temporary storage buffer.

2. The method as in claim 1 wherein each multimedia channel in said set is comprised of packets of multimedia content.

3. The method as in claim 2 wherein said packets are identified as containing data for a particular multimedia channel by way of a unique packet identification ("PID") code.

4. The method of claim 1, wherein determining said point in said temporary storage buffer comprises:

receiving with said multiplexed multimedia channels an index comprising a pointer to an address within said multiplexed multimedia channels to begin demultiplexing and decoding said first channel in order to view said program.

5. The method of claim 1, wherein determining said point in said temporary storage buffer comprises:

generating, as said multiplexed multimedia channels are received, an index comprising a pointer to an address in said multiplexed multimedia channels to begin demultiplexing and decoding said first channel in order to view said program.

6. The method as in claim 1 wherein said buffer is configured to store a specified block of time of said multiplexed multimedia channels.

7. A set top box system comprising:

tuning means to receive a broadcast signal containing a set of multiplexed multimedia channels from a cable or satellite service provider;

storage means to store said multiplexed multimedia channels in a temporary storage buffer on a mass storage device and if the multiplexed multimedia stream is encrypted, to store a plurality of encryption keys associated with the multiplexed multimedia channels and timing data associated with the plurality of encryption keys; and selection means to select a first channel of said multiplexed multimedia channels in said set stored on said mass storage device responsive to a user request to view multimedia content contained in said first multimedia channel;

playback point determination means for determining a point in said temporary storage buffer to begin demultiplexing and decoding said first multimedia channel responsive to a user request to view a particular program on said first multimedia channel, said point indicating the start of said program on said first multimedia channel without receiving a user request to return to the beginning of the particular program;

selecting an encryption key from among the plurality of encryption keys, the selection being based upon the point determined by playback point determination means; and demultiplexing and decoding and decryption means to demultiplex and decode and decrypt said first channel from said point within said temporary storage buffer using the selected encryption key and subsequent keys respectively associated with subsequently retrieved portions of the particular program.

8. The system as in claim 7 wherein each multimedia channel is comprised of packets of multimedia content.

9. The system of claim 7, further index generation means to generate, as said multiplexed multimedia channels are received, an index comprising a pointer to an address in said multiplexed multimedia channels to begin demultiplexing and decoding said first channel in order to view said program.

10. The method as in claim 7 wherein said buffer is configured to store a specified block of time of said multiplexed multimedia channels.

11. The method as in claim 7 wherein said buffer is configured to store a specified amount of multimedia content.

12. A system for processing a plurality of multimedia channels comprising:

a tuner to receive a broadcast signal at a specified frequency and convert said broadcast signal to a baseband signal;

a demodulator to demodulate said baseband signal to produce a plurality of multiplexed multimedia channels;

a mass storage device for storing said set of multiplexed multimedia channels and for storing a plurality of encryption keys respectively associated with segments of the multiplexed multimedia channels;

selection logic for selecting one of said multiplexed multimedia channels stored on said mass storage device to render on a display responsive to a user command and for determining a point in said set of multimedia channels to begin demultiplexing said selected multimedia channels responsive to a user request to view a particular program within said selected multimedia channel, said point indicating the start of said program without receiving a user request to return to the beginning of the particular program;

a secure micro component operable to select an encryption key from the plurality of encryption keys based on the selected point in the selected multimedia channel; and a multi-channel PID filter module to demultiplex said selected multimedia channel prior to decrypting and rendering said selected multimedia channel on said display from said beginning point.

13. The system as in claim 12 wherein each of said multimedia channels are logically separated into a series of programs.

14. The system as in claim 13 wherein said multi-channel PID filter continues to store a first program on a first multimedia channel of said set of multiplexed multimedia channels as long as said first program on said first multimedia channel is being broadcast by a cable or satellite provider.

15. The system as in claim 14 wherein said first program is deleted from said mass storage device when said cable or satellite provider stops broadcasting said first program.

16. The system as in claim 15 wherein said multi-channel PID filter begins storing a second program of said first multimedia channel to said mass storage device responsive to said cable or satellite provider transmitting said second program.

17. The system as in claim 14 wherein, responsive to a user request to view said first program on said first multimedia channel, said selection logic selects said first program to be decoded and rendered on said display from the start of said first program.

18. The system as in claim 12 further comprising:
a long term storage buffer configured on said mass storage device for recording one or more of said multimedia channels for an indefinite period of time responsive to a user request to record said one or more programs.

19. The system as in claim 12 further comprising:
a graphical user interface displaying a list of program entries from which a user may select, said program entries corresponding to one or more entire programs transmitted within said set of multiplexed multimedia channels.

20. The system as in claim 19 wherein said graphical user interface further comprises selection regions associated with each of said program entries and wherein, responsive to a user selection of one or more of said selection regions, said programs associated with said selection regions are stored in a long term storage buffer configured on said mass storage device.

21. The system as in claim 19 wherein said program entries include a video portion for displaying a video relating to said one or more programs.

22. The system as in claim 21 wherein said program entries further include an information portion for displaying information related to said one or more programs.

23. The system as in claim 22 wherein said information portion is comprised of one or more uniform resource locators ("URLs").

24. The system as in claim 21 wherein said program entries are grouped into one or more categories.

25. The system of claim 12, wherein said selection logic is further to receive with said set of multiplexed multimedia channels an index comprising a pointer to an address in said set of multiplexed multimedia channels to begin demultiplexing and decoding said first multimedia channel in order to view said program.

26. The system of claim 12, further comprising index generation logic to generate, as said multiplexed multimedia channels are received, an index comprising a pointer to an address in said multiplexed multimedia channels to begin demultiplexing and decoding said first multimedia channel in order to view said program.

27. A set top box system comprising:
a wideband tuner to receive two or more groups of multiplexed multimedia channels at a plurality of specified frequency ranges;
a wideband demodulator to demodulate said two or more groups of multiplexed multimedia channels;
a mass storage device to store said two or more groups of multiplexed multimedia channels including a plurality of encryption keys respectively associated with segments of the two or more groups of multiplexed multimedia channels;
a wideband multi-channel PID filter module to filter certain multimedia channels from said two or more groups of multimedia channels; and
selection logic for selecting one or more of said filtered multimedia channels to render on a display, wherein said selection logic is further to determine a point in said mass storage device to begin decoding a first channel responsive to a user request to view a particular program on said first channel, said point indicating the start of said program on said first channel without receiving a user request to return to the beginning of the particular program;
a secure micro component operable to select an encryption key from among the plurality of encryption keys based upon a segment of the particular program identified by the selection logic.

28. The system as in claim 27 wherein a first channel of said filtered channels is logically separated into a series of programs.

29. The system as in claim 28 wherein said wideband multi-channel PID filter continues to store a first program of said first channel to said mass storage device as long as said first program in said first channel is being broadcast by a cable or satellite provider.

30. The system as in claim 29 wherein said first program is deleted from said mass storage device when said cable or satellite provider stops broadcasting said first program.

31. The system as in claim 30 wherein said wideband multi-channel PID filter begins storing a second program to said mass storage device responsive to said cable or satellite provider transmitting said second program.

32. The system as in claim 29 wherein, responsive to a user request to view said first program, said selection logic selects said first program to be decoded and rendered on said display from the start of said first program.

33. The system as in claim 28 further comprising:
a long term storage buffer configured on said mass storage device for recording one or more programs for an indefinite period of time responsive to a user request to record said one or more programs.

34. The system as in claim 27 wherein said two or more groups of multiplexed multimedia channels comprise all channels broadcast by a cable or satellite provider.

* * * * *